A. N. PURCELL.
RUNNER FOR WHEELED VEHICLES.
APPLICATION FILED MAY 7, 1920.

1,388,757. Patented Aug. 23, 1921.

Inventor
Arthur N. Purcell,
By E. Hume Talbert
Attorney

UNITED STATES PATENT OFFICE.

ARTHUR N. PURCELL, OF CORONA, NEW YORK.

RUNNER FOR WHEELED VEHICLES.

1,388,757.   Specification of Letters Patent.   Patented Aug. 23, 1921.

Application filed May 7, 1920. Serial No. 379,555.

*To all whom it may concern:*

Be it known that I, ARTHUR N. PURCELL, a citizen of the United States of America, residing at Corona, in the county of Queens and State of New York, have invented new and useful Improvements in Runners for Wheeled Vehicles, of which the following is a specification.

The object of the invention is to provide a runner readily and quickly attachable to wheeled vehicles to convert the same into sleighs, and further to provide in such a runner a construction which may be readily made in various sizes so that the general plan may be employed in making a device for hand drawn vehicles or vehicles of larger sizes.

A further object of the invention is to provide a device of this character which is simple, durable and effective in operation and inexpensive to manufacture.

The invention is illustrated and described in a specific embodiment to which, however, it is not to be restricted, the right is reserved to make such changes or alterations as the actual reduction to practice may suggest in so far as such changes or alterations fall within the scope of the appended claim.

In the accompanying drawings:—

Figure 1:
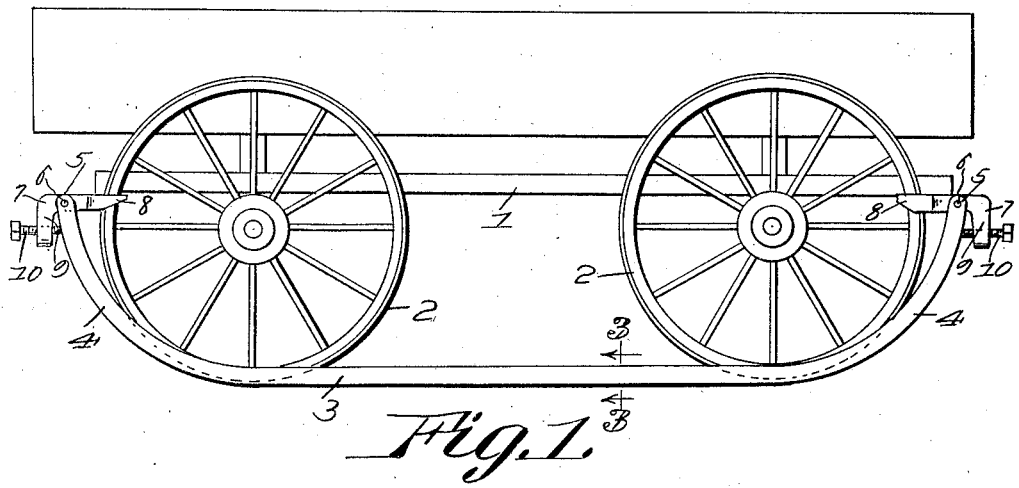
Figure 1 is a view in side elevation of a vehicle to which the invention is attached.
Figure 2:
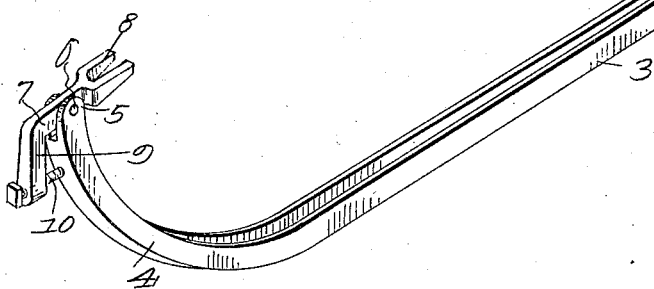
Fig. 2 is a perspective view of the device *per se*.
Figure 3:
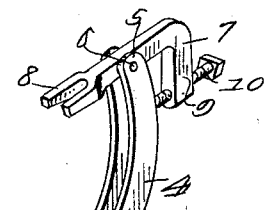
Fig. 3 is a section on the line 3—3 of Fig. 1.

As illustrated, the invention is designed for attachment one to the two wheels on each side of a vehicle such as that indicated by 1 in Fig. 1 of the drawings, and provided with the forward and rear wheels 2. The runner generally designated by 3 is channel shaped and curved upward as indicated at 4, at both ends, the radius of the curve being greater than the radius of the wheels 2. The curved ends 4 of the runner embrace the lower forward quarter circumference of the front wheel and the lower rear quarter circumference of the back wheel and provide seats for the two wheels, the tires of which rest on the web of the runner and the flanges of which abut the sides of the wheels.

The extremities of the runners are carried to a higher point than the extremities of the wheels with which it is used and the web portion at the extremities is cut away to provide pairs of spaced ears 5 crossing which there are the pins 6 serving as pivots for the bent levers 7, one extremity of each of which is formed with a fork 8 designed to straddle the adjacent wheel. The tail 9 of each lever is disposed at an angle to the main portion of the lever and is drilled and tapped to receive the set screw 10, the end of which bears against the web portion of the runner to force the fork end of the lever into engagement with the wheel. Obviously backing the screw out will permit the forked end of the lever to be raised and disengaged from the wheel, the levers of this operation as respects the screw bringing the lever into clamping engagement with the wheel.

The invention having been fully described what is claimed as new and useful is:—

A runner for the purpose indicated which is channel shaped in cross section and curved upwardly at its forward and rear ends, bent levers pivotally mounted in the extremities of the runner and formed each at one end with a wheel engaging fork, and set screws threadingly engaging the remaining ends of the levers and bearing against the web of the runner, whereby the levers may be maintained in engagement with the wheels.

In testimony whereof I affix my signature.

ARTHUR N. PURCELL.